UNITED STATES PATENT OFFICE 2,359,730

DERIVATIVES OF NAPHTHOSULTONES AND A PROCESS FOR THEIR MANUFACTURE

Guido Schetty, Basel, Switzerland, assignor to the Swiss firm of J. R. Geigy A. G., Basel, Switzerland No Drawing. Application July 19, 1943, Serial No. 495,356. In Switzerland October 2, 1942

11 Claims. (Cl. 260—327)

I have surprisingly found that naphthosultone, the inner ester of the 1-hydroxynaphthalene-8-sulfonic acid, can be condensed with carboxylic acid and sulfonic acid halides respectively in the presence of aluminium chloride with a smooth reaction and without any change of the sultone ring thus giving naphthosultone-4-ketones and naphthosultone-4-sulfones of the formulae

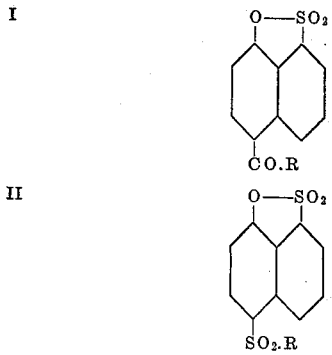

I

II

In these Formulae I and II, R represents the radical of the acid halide used.

The condensation is preferably carried out at a raised temperature in the presence of solvents like nitrobenzene, trichlorobenzene, chloroform, petroleum ether and so on. Of course, the conditions largely depend on the capability of reaction of the acid halides and on the naure of the solvent. Very reactive acid halides like for instance acetyl chloride react already very well at a moderately raised temperature (40°–60° C.), while acid halides which react slowly such as 4-methylbenzene-1-sulfochloride, require higher temperatures. The structure of the acid halide also influences the reaction conditions. While for example straight chain aliphatic carboxylic halides like normal butyric acid chloride or aromatic carboxylic acid halides such as benzoyl chloride, 4-nitrobenzoyl chloride, 4-chloro-3-nitrobenzoyl chloride, 4-methylbenzene-1-sulfochloride lead with a smooth reaction to naphthosultone-4-methylketone, naphthosultone-4-propylketone, naphthosultone - 4 - phenylketone, naphthosultone - 4 - (4' - nitrophenyl) - ketone, naphthosultone - 4 - (4' - chloro - 3' - nitrophenyl) - ketone and naphthosultone - 4 - (4' - methylphenyl) - sulfone, other preponderantly branched aliphatic carboxylic acid halides yield also resins besides the ketones to be expected. By saponifying the new naphthosultone derivatives by means of alkalis there are obtained 1-hydroxynaphthalene-8-sulfonic acid derivatives. The disodium salts thereof possess a manifest crystallising power; they are relatively difficultly soluble in cold water. In view of the said low solubility they may readily be prepared in suitable concentrations and alkalinity and in an extreme purity from the obtained raw sultone reaction mixtures by saponification with caustic soda lye and allowing the same to crystallise; unchanged naphthosultone is thus converted into the easily soluble disodium salt of the 1-hydroxynaphthalene-8-sulfonic acid and remains in the mother-liquors.

By boiling the new 1-hydroxynaphthalene-8-sulfonic acid derivatives with phosphorus oxychloride the corresponding naphthosultone derivatives are again reformed nearly quantitatively.

On shaking the naphthosultone derivatives obtained according to the present invention with concentrated aqueous ammonia or by a weak heating of the same with aqueous ammonium carbonate solution the corresponding 1-hydroxynaphthalene-8-sulfamide derivatives are produced by the addition of ammonia.

The new compounds have been found suitable as intermediate products for the preparation of dyestuffs.

In order to illustrate the present invention the same may now be fully described by the following examples, without being limited thereto. The parts are by weight.

Example 1

103 parts of naphthosultone are treated with 300 parts of dry trichlorobenzene in a vessel provided with a reflux-cooler and stirrer with exclusion of moisture and then with 100 parts of aluminium chloride. Thereby the whole mixture gets weakly warm while forming a viscous solution. Then 47 parts of acetyl chloride (or the corresponding quantity of acetyl bromide) are added and heated to 60° C.; during this operation considerable quantities of hydrogen chloride are evolved. When the formation of gas has diminished, the temperature is raised to 100° C. and the mixture stirred for 2 to 4 hours at this temperature until the reaction has ceased. Then the reaction mixture is decomposed by means of ice and some concentrated hydrochloric acid and the trichlorobenzene is distilled off with steam. The crystalline naphthosultone-4-methyl-ketone is sucked off, thoroughly washed with water and dried. The yield of raw substance amounts to 123 parts or 99% of the theory. After several recrystallisations from chloroform and alcohol the ketone possesses the melting point of 171°–172° C.

The trichlorobenzene may also be replaced by nitrobenzene, petroleum ether, chloroform and the like. If working is effected in the presence of both the latter compounds, the reaction duration must be prolonged in view of the low boiling points of these solvents.

124 parts of the raw naphthosultone-4-methylketone are stirred in 500 parts of hot water and boiled for a short time after having added 140 parts of 30% caustic soda lye; during this operation the sultone derivative is dissolved with a deep yellow color. The solution is hot clarified and then allowed to cool, whereby 1-hydroxy-naphthalene - 4 - methylketone - 8 - sulfonic acid crystallises as disodium salt in form of brown-yellow long needles. In this manner 146 parts of a product containing 3-molecules of crystal water are obtained after isolating and pressing, which corresponds to a yield of 80 per cent of the theory referred to naphthosultone.

37.5 parts of raw naphthosultone-4-methylketone are shaken during 15 hours with 65 parts of 25% ammonia. The ammonium salt of the 1-hydroxynaphthalene - 8 - sulfamido-4-methylketone crystallising in form of loamy yellow little needles is filtered by suction, suspended in hot water, dissolved by adding diluted caustic soda lye, then acidified with mineral acid and filtered off. After a further dissolution in diluted caustic soda lye and precipitation by means of acid 33 parts of 1-hydroxynaphthalene-8-sulfamido-4-methylketone remain as a bright powder melting at 195°–197° C. (while foaming).

By using normal butyric acid chloride there may be produced in the manner indicated the naphthosultone-4-propylketone (M. P. 131°–132° C.), the 1-hydroxynaphthalene-8-sulfamido-4-propylketone (M. P. 157.5°–158° C. with foaming) and the 1-hydroxynaphthalene-4-propylketone-8-sulfonic acid.

Phenyl acetyl chloride reacts in the same manner with naphthosultone thus giving phenyl acetyl naphthosultone.

*Example 2*

A mixture of 206 parts of naphthosultone, 600 parts of trichlorobenzene, 200 parts of aluminium chloride and 160 parts of isovalerianic acid chloride is slowly heated to 100° C. with stirring and exclusion of moisture; stirring is continued until no more hydrogen chloride is developed, the dark oil being then decomposed by means of ice and hydrochloric acid and the trichlorobenzene distilled with steam. The raw naphthosultone-4-isobutylketone remains as a dark oil becoming solid on cooling thus yielding a waxy-like mass. The same is stirred with 1200 parts of hot water, boiled for 1 hour under reflux and while stirring with 300 parts of 30% caustic soda lye, then hot filtered from black greasy decomposition products, whereupon the clear yellow-brown filtrate is treated with 120 parts of sodium chloride. The 1-hydroxynaphthalene-4-isobutylketone - 8 - sulfonic acid crystallises already from the hot solution as disodium salt in form of golden-yellow little leaves, which after cooling is filtered by suction and obtained in absolutely pure condition by a single recrystallisation from hot water.

35.2 parts of the sharply dried disodium salt of the 1-hydroxynaphthalene- 4 -isobutylketone-8-sulfonic acid are boiled under reflux for 3 hours with 300 parts of phosphorus oxychloride, then the reaction mixture is decomposed by means of ice, the naphthosultone-4-isobutylketone thus precipitated in a sandy form is sucked off and washed out with water. By recrystallisation from concentrated acetic acid or from chloroform and alcohol the said compound is obtained in form of little crystals melting at 121.5°–122.5° C.; the yield amounts to 26 parts or 90% of the theory.

29 parts of naphthosultone-4-isobutylketone are stirred during 5–6 hours at 60°–70° C. in a solution of 12 parts of ammonium carbonate in 80 parts of water. The sultone derivative is thus converted into the ammonium salt of the 1-hydroxynaphthalene - 8 -sulfamido-4-isobutylketone which precipitates in form of loamy-yellow little needles. It is worked up like the 1-hydroxynaphthalene- 8 -sulfamido - 4 - methylketone according to the indications made in Example 1. When proceeding in this manner a white crystalline powder is obtained melting (under foaming) at 147°–148° C.

*Example 3*

168 parts of benzoyl chloride are allowed to drop at 30°–40° C. into a mixture of 206 parts of naphthosultone, 600 parts of trichlorobenzene and 200 parts of aluminium chloride, then the temperature is slowly raised to 100° C. and the mixture stirred at this temperature until practically no more hydrogen chloride escapes; this will be the case after about 5 hours. Now, the dark oil is decomposed by means of ice and some hydrochloric acid and the trichlorobenzene is removed by distillation with steam. The naphthosultone-4-phenylketone remains in form of a crystalline bright-brown sand in the theoretical yield. By dissolving the same several times in chloroform and subsequent precipitating by means of ethanol the product is obtained in form of solid crystals melting at 156°–159° C.

Benzoyl bromide reacts in exactly the same manner.

By saponification of the raw naphthosultone-4-phenylketone with the calculated quantities of diluted caustic soda lye, for instance according to the indications given in Example 1, the disodium salt of the 1-hydroxy-naphthalene-4-phenylketone-8-sulfonic acid is obtained in canary-yellow, difficultly soluble crystals. The yield is 85–90% of the theory referred to naphtosultone.

*Example 4*

41.2 parts of naphthosultone, 225 parts of trichlorobenzene, 40 parts of aluminum chloride and 48 parts of 4-nitrobenzoylchloride are stirred during 4–5 hours at 120° C. After this period the development of hydrogen halide has been completed and the reaction product consists of dark crystalline lumps. The latter are decomposed with ice and hydrochloric acid, the solvent is distilled off with steam and the dark raw naphthosultone derivative washed with water until neutral. In order to remove still adhering 4-nitrobenzoic acid it is well pasted with a little water and cold stirred for some hours with 150 parts of 10% sodium carbonate solution. After filtration by suction, washing out and drying the product thus prepurified is extracted during some hours by means of chloroform, wherein it is practically insoluble. By this operation the colored impurities go into solution. Finally, there remain 56 parts of naphthosultone-4-(4'-nitrophenyl) -ketone in form of a weakly brownish powder melting at 231°–232.5° C. and corresponding to a yield of 79% of the theory.

When this compound is boiled with the calculated quantities of caustic soda lye, the disodium salt of the 1-hydroxynaphthalene-4-(4'-nitrophenyl)-ketone-8-sulfonic acid is obtained which is very difficultly soluble and crystallises in form of chocolate-brown aggregates. The monosodium salt which may be produced by causing the disodium salt to react with hydrochloric acid crystallises in form of lemon yellow needles. It is still more difficultly soluble in water than the disodium salt.

By reducing the 1-hydroxynaphthalene-4-(4'-nitrophenyl)-ketone-8-sulfonic acid the 1-hydroxy-naphthalene-4-(4'-aminophenyl)-ketone-8-sulfonic acid is obtained according to known methods in form of a crystalline uncolored body.

The condensation takes place in a similar manner, when using 4-chloro-3-nitrobenzoic acid chloride instead of 4-nitrobenzoic acid chloride. Thus the naphthosultone-4-(4'-chloro-3'-nitrophenyl)-ketone is produced in a good yield which is obtained, on recrystallization from dioxane, in form of a chocolate-brown crystal powder melting at 218°–219° C.

*Example 5*

Into the viscous solution of 103 parts of naphthosultone and 100 parts of aluminum chloride in 300 parts of trichlorobenzene 148 parts of 4-methylbenzene-1-sulfochloride are introduced and heated for 1 hour to 105° C. Then the temperature is increased within 6 hours up to 120° C., whereupon the clear viscous solution is decomposed by means of ice and hydrochloric acid and treated with steam. Finally, the sulfone precipitated in a crystalline form is filtered by suction. After a single recrystallisation from chloroform and alcohol 160 parts of naphthosultone-4-(4'-methylphenyl)-sulfone result in form of a white powder melting at 214°–217° C. This yield corresponds to 89% of the theory. After a further recrystallisation from chloroform and alcohol the sulfone is completely pure; then it melts at 215°–216.5° C.

The 1-hydroxynaphthalene-8-sulfamido-4-(4'-methylphenyl)-sulfone resulting from the above compound by addition of ammonium melts unsharply at 262° C. with foaming.

180 parts of naphthosultone-4-(4'-methylphenyl)-sulfone in 500 parts of water are heated to boiling for some minutes with 40 parts of 30% caustic soda lye. During this operation a clear yellow solution is formed, to which hot solution is added, the same volume of alcohol. On cooling the disodium salt of the 1-hydroxynaphthalene-4-(4'-methylphenyl)-sulfone-8-sulfonic acid separates out in form of white solid needles. The product dried at 80° C. contains crystal alcohol.

If in the above example instead of 4-methylbenzene-1-sulfochloride the equivalent quantity of 2-nitrobenzene-1-sulfochloride, 4-chlorobenzene-1-sulfochloride, 4-nitro-2-chlorobenzene-1-sulfochloride, 2-nitro-4-chlorobenzene-1-sulfochloride, 4-hydroxy-3-carboxybenzene-1-sulfochloride is used, the reaction takes place in an analogous manner giving the corresponding sulfones; but also aliphatic and araliphatic sulfochlorides, such as methylsulfochloride, ethylsulfochloride, chlorosulfo acetic acid, benzyl sulfochloride, 4-nitro-benzylsulfochloride, react analogously.

What I claim is:

1. A process for the manufacture of derivatives of naphthosultone of the general formula

wherein R stands for a member selected from the group consisting of alkyl, aralkyl and aryl radicals of the benzene series and X stands for a member selected from the group consisting of —CO— and —SO₂—, which comprises the step of condensing naphthosultone in an inert solvent with acid halides selected from the group consisting of alkyl, aralkyl and benzene carboxylic and sulfonic acid halides in the presence of condensing agents.

2. A process for the manufacture of sulfone derivatives of naphthosultone of the general formula

wherein R stands for a member selected from the group consisting of alkyl, aralkyl and aryl radicals of the benzene series, which comprises the step of condensing naphthosultone in an inert solvent with sulfonic acid halides selected from the group consisting of alkyl, aralkyl and benzene sulfonic acids in the presence of condensing agents.

3. A process for the manufacture of ketone derivatives of naphthosultone of the general formula

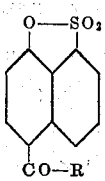

wherein R stands for a member selected from the group of alkyl, aralkyl and aryl radicals of the benzene series, which comprises the step of condensing naphthosultone in an inert solvent with carboxylic acid halides selected from the group consisting of alkyl, aralkyl and benzene carboxylic acids in the presence of condensing agents.

4. A process for the manufacture of ketone derivatives of naphthosultone of the general formula

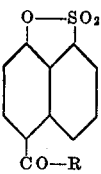

wherein R stands for a member selected from the group of alkyl, aralkyl and aryl radicals of the benzene series, which comprises the step of condensing naphthosultone in an inert solvent with a carboxylic acid chloride selected from the group consisting of alkyl, aralykyl and benzene carboxylic acids in the presence of aluminium chloride.

5. A process for the manufacture of a ketone derivative of naphthosultone of the formula

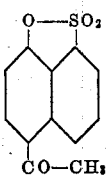

which comprises the step of condensing naphthosultone in an inert solvent with acetylchloride in the presence of aluminium chloride.

6. A process for the manufacture of a ketone derivative of naphthosultone of the formula

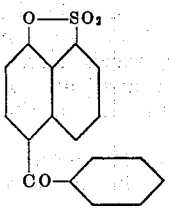

which comprises the step of condensing naphthosultone in an inert solvent with benzoylchloride in the presence of aluminium chloride.

7. A process for the manufacture of a ketone derivative of naphthosultone of the formula

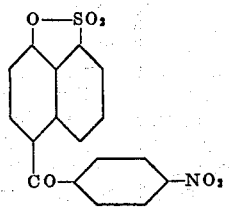

which comprises the step of condensing naphthosultone in an inert solvent with 4-nitrobenzoylchloride in the presence of aluminium chloride.

8. The derivatives of naphthosultone of the general formula

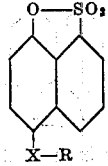

wherein R stands for a member selected from the group consisting of alkyl, aralkyl and aryl radicals of the benzene series and X stands for a member selected from the group consisting of —CO— and —SO$_2$—, being crystallised solids suitable as intermediates in the dyestuff manufacture.

9. The derivative of naphthosultone of the formula

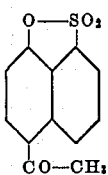

being a crystallised solid of the melting point 171°–172° C.

10. The derivative of naphthosultone of the formula

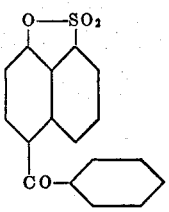

being solid crystals melting at 156°–159° C.

11. The derivative of naphthosultone of the formula

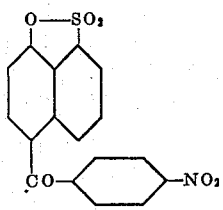

being a brownish powder melting at 231°–232.5° C.

GUIDO SCHETTY.